United States Patent
Shaikh et al.

(10) Patent No.: US 9,032,176 B2
(45) Date of Patent: May 12, 2015

(54) AVOIDING PHYSICAL FRAGMENTATION IN A VIRTUALIZED STORAGE ENVIRONMENT

(71) Applicant: VMware, Inc., Palo Alto, CA (US)

(72) Inventors: Faraz Shaikh, Sunnyvale, CA (US); Murali Vilayannur, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/220,279

(22) Filed: Mar. 20, 2014

(65) Prior Publication Data

US 2014/0208321 A1  Jul. 24, 2014

Related U.S. Application Data

(62) Division of application No. 13/484,001, filed on May 30, 2012, now Pat. No. 8,762,660.

(51) Int. Cl.
| | |
|---|---|
| *G06F 12/00* | (2006.01) |
| *G06F 3/06* | (2006.01) |
| *G06F 12/02* | (2006.01) |
| *G06F 9/455* | (2006.01) |
| *G06F 12/08* | (2006.01) |
| *G06F 11/14* | (2006.01) |
| *G06F 17/30* | (2006.01) |

(52) U.S. Cl.
CPC .............. *G06F 3/0664* (2013.01); *G06F 12/02* (2013.01); *G06F 9/45533* (2013.01); *G06F 12/08* (2013.01); *G06F 11/1435* (2013.01); *G06F 11/1484* (2013.01); *G06F 17/30312* (2013.01); *G06F 3/0604* (2013.01); *G06F 3/0671* (2013.01); *G06F 9/455* (2013.01); *G06F 3/064* (2013.01); *G06F 3/0689* (2013.01); *G06F 2206/1004* (2013.01); *G06F 9/45558* (2013.01); *G06F 2009/45579* (2013.01)

(58) Field of Classification Search
CPC ........ G06F 12/02; G06F 12/08; G06F 9/45533
See application file for complete search history.

(56) References Cited

U.S. PATENT DOCUMENTS 8,818,966 B1 * 8/2014 Nanda ........................... 707/693

* cited by examiner

*Primary Examiner* — Shawn X Gu

(57) ABSTRACT

A virtualized storage stack includes logical layers above the physical storage layer. Each logical layer allocates data blocks, and the data block allocation is propagated down to the physical storage layer. To facilitate contiguous storage, each layer of the virtualized storage stack maintains additional metadata associated with data blocks. For each data block, the metadata indicates whether the data block is free, provisioned and includes a tag that indicates when the data block was first written. Data blocks that were first written as part of the same write request share the same tag, and are mostly guaranteed to be physically co-located. Block allocations that reuse data blocks having the same tag are preferred. Such preference increases the likelihood of the blocks being contiguous in the physical storage as these blocks were allocated as part of the same first write.

20 Claims, 9 Drawing Sheets

Bock Metadata
406

| Block Number 502 | Allocated State 504 | Provisioned State 506 | Write Tag 508 |
|---|---|---|---|
| 0 | Allocated | Provisioned | 3 |
| 1 | Not Allocated | Provisioned | 3 |
| 2 | Not Allocated | Provisioned | 3 |
| ... | | | |
| 89 | Not Allocated | Not Provisioned | 1 |
| 90 | Not Allocated | Provisioned | 1 |
| 91 | Not Allocated | Not Provisioned | N/A |
| 92 | Not Allocated | Not Provisioned | N/A |
| ... | | | |
| Z | | | |

FIGURE 5

AVOIDING PHYSICAL FRAGMENTATION IN A VIRTUALIZED STORAGE ENVIRONMENT

The present application is a divisional of and claims benefit of earlier-filed U.S. patent application Ser. No. 13/484,001, now issued as U.S. Pat. No. 8,762,660, filed on May 30, 2012.

BACKGROUND

Computer virtualization is a technique that involves encapsulating a physical computing machine platform into a virtual machine that is executed under the control of virtualization software on a hardware computing platform, or "host." A virtual machine has both virtual system hardware and guest operating system software. Virtual system hardware typically includes at least one "virtual disk," a single file or a set of files that appear as a typical storage drive to the guest operating system. The virtual disk may be stored on the host platform or on a remote storage device. Typically, a virtual machine (VM) uses the virtual disk to store the guest operating system, application programs, and application data.

In a virtualized environment, application programs executing on the VM access the physical disk space via a virtualization stack. The virtualization stack includes multiple software layers (referred to herein as the "logical layers") above the ultimate physical storage layer, the physical disk. Logical layers of the virtualization stack include the guest operating system, the hypervisor and the virtual machine file system (VMFS) driver. Each logical layer is associated with a data block layer that maintains and tracks the allocation of logical data blocks in response to requests received from the applications executing on the VM. Translation mechanisms in each logical layer allow for managing the relationships between data blocks across different data block layers.

Storage access requests from applications executing on the VM are transmitted to the top-most layer of the virtualization stack, which identifies the logical data blocks in the associated data block layer that correspond to the request. The top layer then transmits the request to the next layer of the virtual storage stack, which in turn identifies the logical data blocks in the associated data block layer that correspond to the request. In such a manner, the request traverses the virtual storage stack until the request reaches the physical layer, where the request is serviced.

In response to write requests received from applications executing on the VM, data blocks in each data block layer associated with a logical layer are allocated for servicing the request. Ultimately, once the logical layers are traversed, disk space in the physical storage layer is allocated for storing the data associated with the write request. In operation, storage virtualization has over-commit goals that lead to sparse allocation of storage blocks in the physical storage layer. More specifically, at each logical layer, storage block allocation is sequenced in order of first writes such that, after a region has been provisioned, block allocation and the underlying physical storage allocation is delayed until a first write occurs in the provisioned region. Such delayed allocation may not preserve spatial locality at the physical storage layer, which may have served other allocation requests in between the receipt of the provisioning request and the allocation request from the particular logical layer. Such a phenomenon leads to fragmentation at the physical storage layer, where storage blocks that should be stored contiguously from a logical point of view are not physically laid out contiguously. Physical fragmentation is highly undesirable because physical co-location of data blocks that are to be accessed sequentially allows for significantly faster access than if those data blocks are not physically co-located.

One solution to reduce fragmentation at the physical storage layer is to increase the size of data blocks in the data block layers associated with the physical layers. With such an approach, a single write request from the application results in allocating enough of extra contiguous physical storage to accommodate physical co-locality of future writes. Such an approach, however, has limitations. More specifically, future writes may never occur and, thus, the allocated space may never be used. Further, large storage block sizes may have an adverse impact on the storage services that a virtualized environment can provide. For example, a large block size is undesirable for de-duplication where probability of finding duplicates depends on blocks sizes being small. Storage related services, like snapshotting, that use copy on write are also adversely affected if the blocks size is too large as larger blocks are to be read before doing a copy on write and eliminating copy on write overheads in cases of full overwrites are reduced. As the foregoing illustrates, there remains a need in the art for an effective storage block allocation technique that reduces the amount of fragmentation.

SUMMARY

One or more embodiments of the present invention provide techniques for allocating data blocks in response to write requests in a manner that reduces the final physical fragmentation.

A method for identifying storage blocks for storing data associated with a write request, according to an embodiment of the present invention, includes the step of reading metadata associated with a set of free storage blocks that were previously written, where the metadata includes a tag for each storage block in the set of storage blocks, and storage blocks in the set of storage blocks that were initially written in response to a single write request share the same tag, thereby indicating a likelihood that physical storage locations that back the storage blocks having the same tag are proximately located. The method also includes the step of identifying one or more storage blocks in the set of free storage blocks for storing data associated with the write request based on the tags of the storage blocks in order to increase a likelihood that the data associated with the write request will be stored in a first set of physical storage locations that are proximately located.

A method for defragmenting physical storage that is accessed through a set of layers of a storage stack, according to one embodiment of the invention, includes the steps of receiving a first defragmentation request at a lower layer from an upper layer, the first defragmentation request indicating a plurality of storage blocks for defragmentation, determining, at the lower layer, a set of storage blocks that correspond to the plurality of storage blocks, and transmitting by the lower layer a second defragmentation request to a layer that is below thereto, the second defragmentation request indicating the set of storage blocks for defragmentation.

Embodiments of the present invention further include a non-transitory computer-readable storage medium storing instructions that when executed by a computer system cause the computer system to perform one or more of the methods set forth above, and a computer system that is configured to carry out one or more of the methods set forth above.

BRIEF DESCRIPTION OF THE DRAWINGS

FIG. 5 illustrates a detailed block diagram of block metadata maintained by the block allocation unit of FIG. 4.

DETAILED DESCRIPTION

Figure 1:
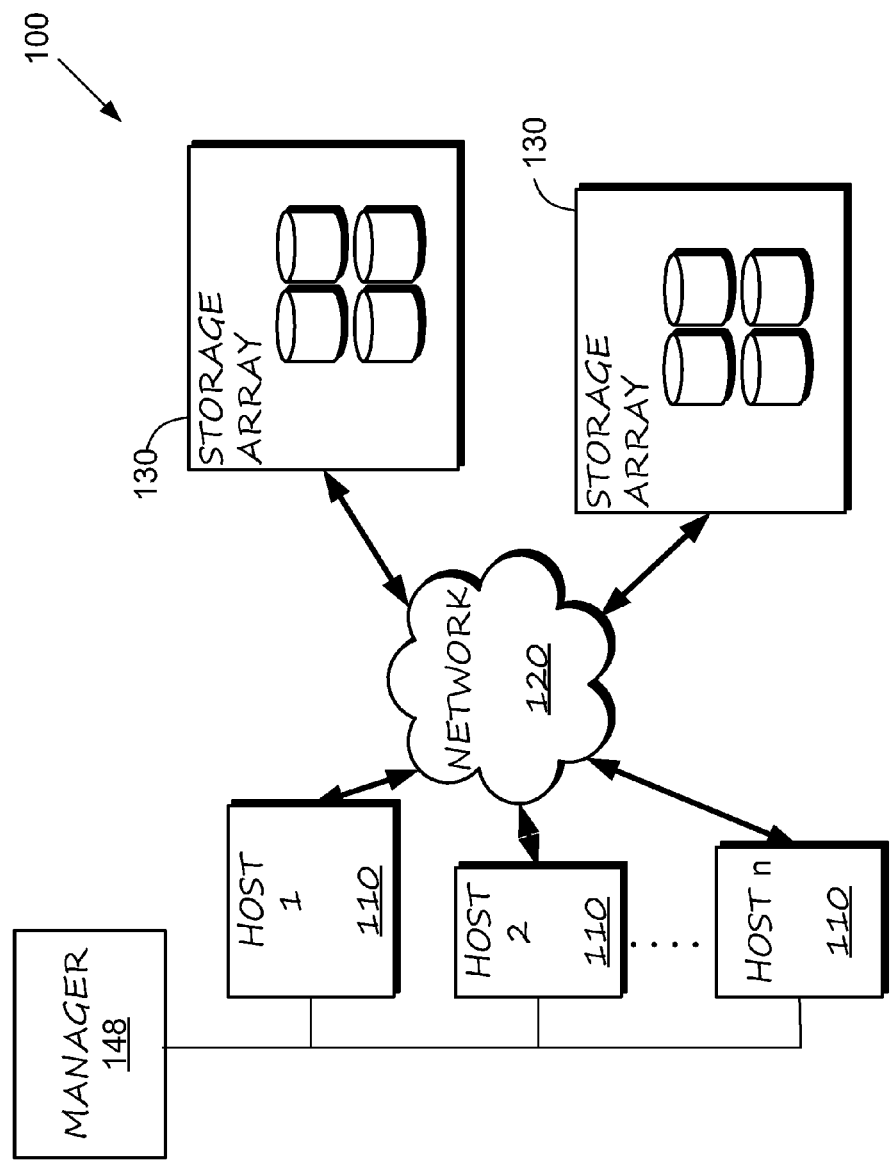
FIG. 1 is a block diagram that shows a virtualized computer architecture including servers and storage arrays that are configured according to one or more embodiments.

FIG. 1 is a block diagram that shows a virtualized computer architecture 100 including servers and storage arrays that are configured according to one or more embodiments. Virtualized computer architecture 100 includes a plurality of servers 110 connected through network 120 to a shared storage system that includes one or more storage arrays 130. There may be any number of servers 110, each of which may comprise a general purpose computer system having one or more virtual machines accessing data stored on any number of storage arrays 130. Network 120 may be a wide area network, a local area network, or a network hosting a protocol especially suited for storage arrays 130, such as Fibre Channel, iSCSI, HyperSCSI, etc., and may comprise one or more of Fibre Channel switches. Storage arrays 130 may be of any type such as a network-attached storage (NAS) filer or a block-based device over a storage area network (SAN). While storage arrays 130 are typically made up of a plurality of rotating disks, it should be recognized that as prices for solid-state non-volatile storage devices fall, they are increasingly taking the place of rotating disk storage media. The use of the term, "disk" herein, should therefore not be construed as limited only to rotating disk storage media, but also what is become known as solid state disks, or "SSDs."

Virtualized computer architecture 100 is managed by a manager 148, which is a computer program that resides and executes in a central server or alternatively, in one of servers 110. Manager 148 is in communication with each of servers 110, and carries out administrative tasks for virtualized computer architecture 100 such as load balancing between servers 110 and workload balancing between storage arrays 130.

Figure 2A:
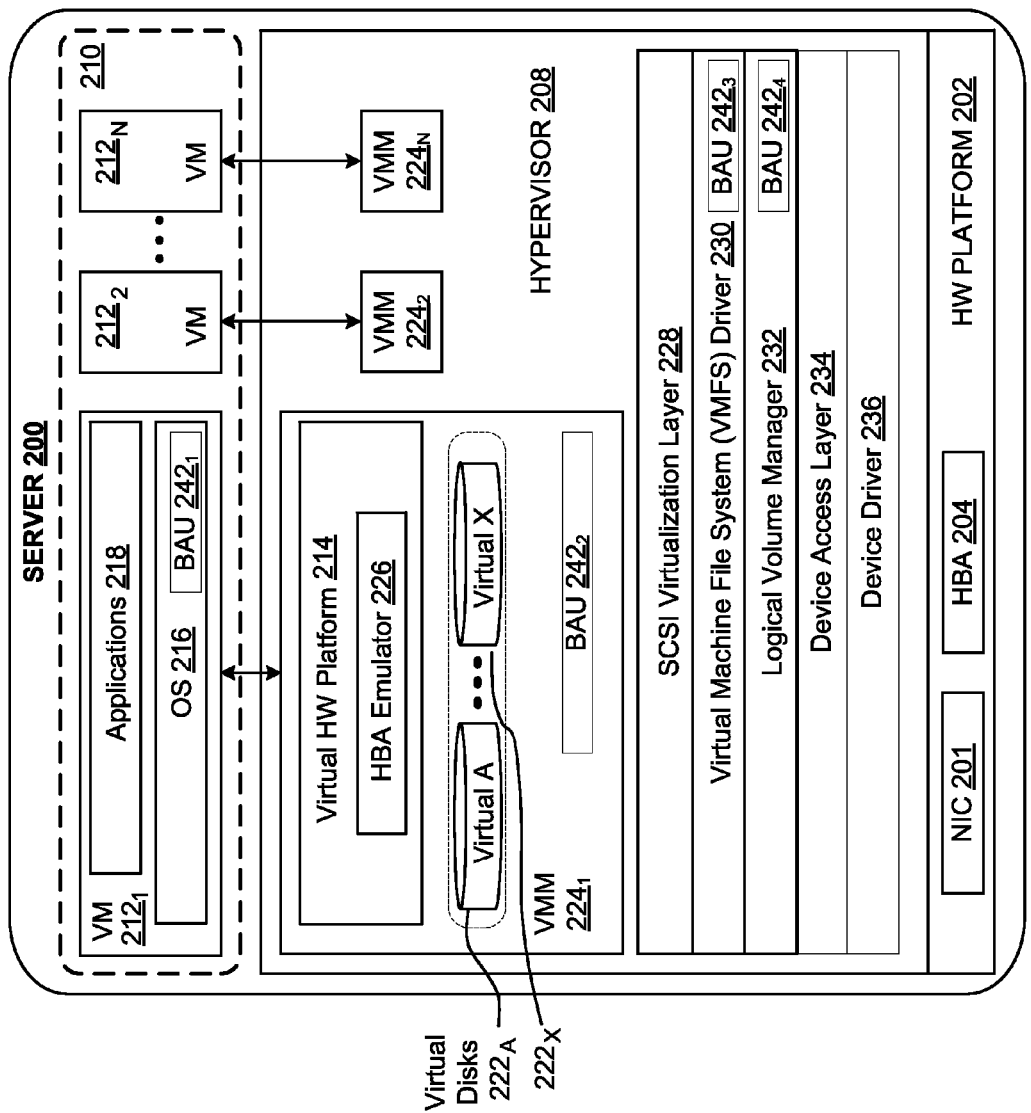
FIG. 2A depicts a block diagram representative of a server in the virtualized computer architecture of FIG. 1.
Figure 2B:
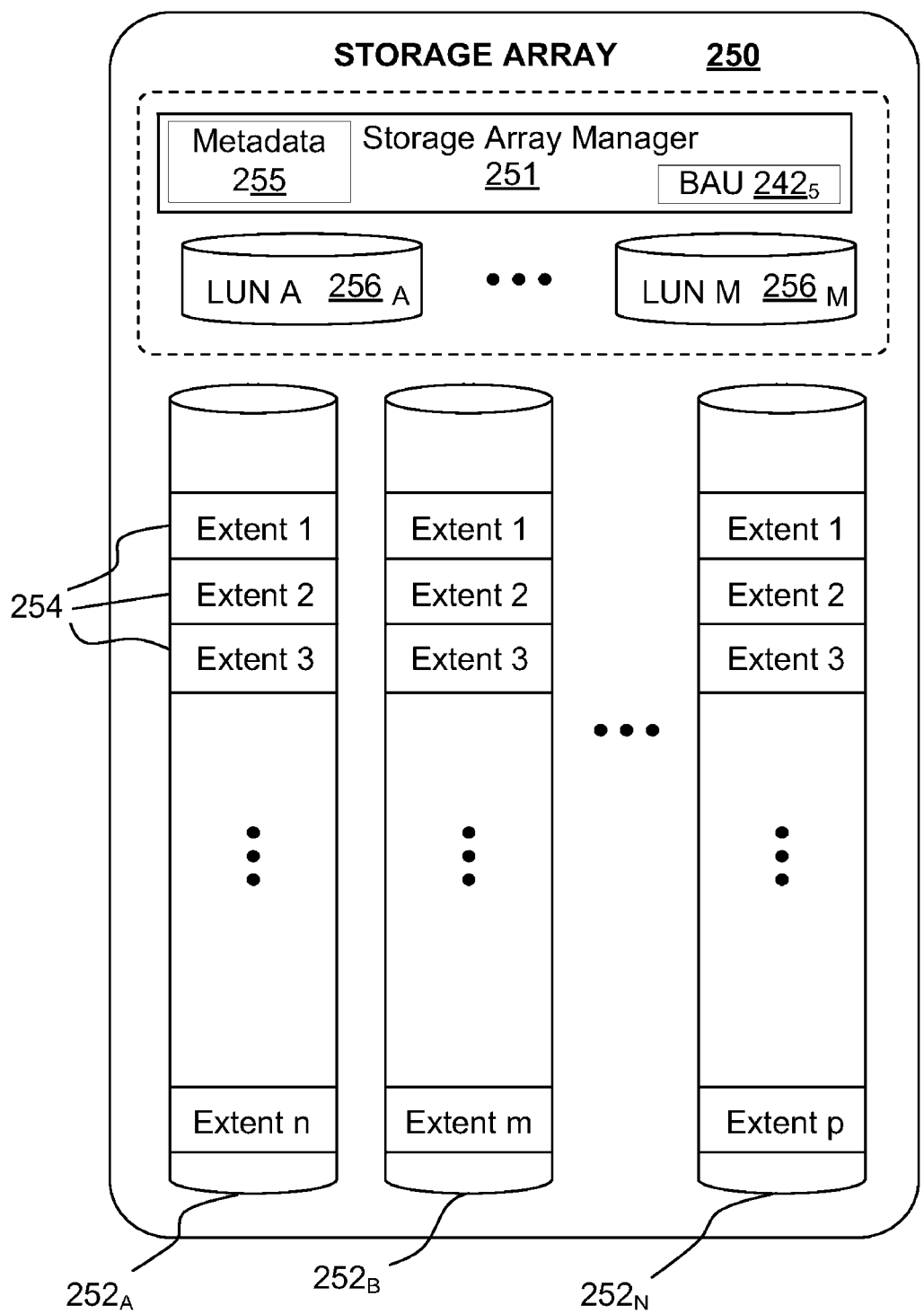
FIG. 2B depicts a block diagram representative of a storage array in the virtualized computer architecture of FIG. 1.

FIGS. 2A and 2B respectively depict block diagrams of a server 200 that is representative of any of servers 110 and a storage array 250 that is representative of any of storage arrays 130. Server 200 may be constructed on a conventional, typically server-class, hardware platform 202. As shown in FIG. 2A, server 200 includes one or more host bus adaptors (HBA) 204 and one or more network interface controllers (NIC) 201 that enable server 200 to connect to storage array 250. As further shown in FIG. 2A, hypervisor 208 is installed on top of hardware platform 202 and it supports a virtual machine execution space 210 within which multiple virtual machines (VMs) $212_1$-$212_N$ may be concurrently instantiated and executed. Each such virtual machine $212_1$-$212_N$ implements a virtual hardware platform 214 that supports the installation of a guest operating system 216 which is capable of executing applications 218. Examples of a guest operating system 216 include any of the well-known commodity operating systems, such as Microsoft Windows®, Linux®, and the like. In each instance, guest operating system 216 includes a native file system layer (not shown in FIG. 2A), for example, either an NTFS or an ext3FS type file system layer. These file system layers interface with virtual hardware platforms 214 to access, from the perspective of guest operating systems 216, a data storage HBA, which in reality, is a virtual HBA implemented as software within virtual hardware platform 214 that provides the appearance of disk storage support (e.g., virtual disks or virtual disks $222_A$-$222_X$). In certain embodiments, virtual disks $222_A$-$222_X$ may be thinly provisioned and appear to support, from the perspective of guest operating system 216, the SCSI standard for connecting to the virtual machine or any other appropriate hardware connection interface standard such as including IDE, ATA, and ATAPI.

Although, from the perspective of guest operating systems 216, file system calls initiated by such guest operating systems 216 to implement file system-related operations appear to be routed to virtual disks $222_A$-$222_X$ for final execution, in reality, such calls are processed and passed to adjunct virtual machine monitor (VMM) layers $224_1$-$224_N$ that implement the virtual system support needed to coordinate operation with hypervisor 208. In particular, HBA emulator 226 functionally enables the file system calls generated in the guest operating system 216 to be correctly handled by hypervisor 208 which ultimately passes such operations through its various layers to HBA 204 or NICs 201 that connect to storage array 250. Assuming a SCSI supported virtual device implementation (although it should be recognized that other hardware interface standards may be used in alternative embodiments), SCSI virtualization layer 228 of hypervisor 208 receives, for example, a data transfer operation, such as a read operation, (in the form of SCSI commands, for example, intended for a SCSI-compliant virtual disk) from VMM layers $224_1$-$224_N$, and converts them into file system operations that are understood by virtual machine file system (VMFS) driver 230 in order to access a file stored in one of the LUNs in storage array 250 under the management of VMFS driver 230 that represents the SCSI-compliant virtual disk (e.g., one of virtual disks $222_A$-$222_X$). In one embodiment, the file representing the virtual disk conforms to the .vmdk file format promulgated by VMware, Inc. for virtual disks, although it should be recognized that alternative virtual disk file formats may be used in other embodiments.

SCSI virtualization layer 228 then issues these VMFS operations to VMFS driver 230. VMFS driver 230, in general, manages creation, use, and deletion of files (e.g., such as .vmdk files representing virtual disks) stored on LUNs exposed by storage array 250. One example of a clustered file system that can serve as the VMFS in an embodiment is described in U.S. Pat. No. 7,849,098, entitled "Multiple Concurrent Access to a File System," filed Feb. 4, 2004 and issued on Dec. 7, 2010, the entire contents of which are incorporated by reference herein. VMFS driver 230, converts the file system operations received from SCSI virtualization layer 228 to volume (e.g. LUN) block operations, and provides the volume block operations to logical volume manager 232. Logical volume manager (LVM) 232 is typically implemented as an intermediate layer between the driver and file system layers, and supports volume oriented virtualization and management of the LUNs accessible through HBAs 204 and NIC 201. LVM 232 issues raw SCSI operations to device access layer 234 based on the LUN block operations. Device access layer 234 discovers storage array 250, and applies command queuing and scheduling policies to the raw SCSI operations. Device driver 236 understands the input/output interface of HBAs 204 and NIC 201 interfacing with storage array 250, and sends the raw SCSI operations from device access layer 234 to HBA 204 or NIC 201 to be forwarded to storage array 250.

OS 216, VMMs 224, VMFS driver 230 and logical volume manager 232 each implement a block allocation unit (BAU) $242_1$-$242_4$. As described in greater detail below, each block allocation unit 242 manages free blocks and allocates data blocks in a corresponding data block layer. Using the techniques described below, each block allocation unit 242 allocates data blocks in a manner that increases the likelihood that the data is stored contiguously in physical storage.

It should be recognized that the various terms, layers and categorizations used to describe the virtualization components in FIG. 2A may be referred to differently without departing from their functionality or the spirit or scope of the invention. For example, VMMs 224 may be considered separate virtualization components between VMs 212 and hypervisor 208 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine.

Storage array manager 251 of storage array 250, as depicted in FIG. 2B, receives the raw SCSI operations corresponding to one of its LUNs and resolves them into the appropriate extents within the spindles of storage array 250 that are operated upon. Storage array manager 251, which represents one or more programmed storage processors, generally serves as a communication agent (to the outside world) for storage array 250, and implements a virtualization of physical, typically disk drive-based storage units, referred to in FIG. 2B as spindles $252_A$-$252_N$, that reside in storage array 250. From a logical perspective, each of these spindles can be thought of as a sequential array of fixed sized extents 254. Storage array manager 251 abstracts away complexities of targeting read and write operations to addresses of the actual spindles and extents of the disk drives by exposing to server 200 an ability to view the aggregate physical storage space provided by the disk drives as a contiguous logical storage space that may be divided into a set of virtual SCSI block devices previously referred to herein as LUNs $256_A$-$256_M$ ("Logical Unit Numbers"). The virtualization of spindles $252_A$-$252_N$ into such a contiguous logical storage space of LUNs $256_A$-$256_M$ can provide a more efficient utilization of the aggregate physical storage space that is represented by an address space of a logical volume. Storage array manager 251 maintains metadata 255 that includes a mapping (hereinafter, also referred to as an extent-mapping) for each of LUNs $256_A$-$256_M$ to an ordered list of extents, wherein each such extent can be identified as a spindle-extent pair <spindle #, extent #> and may therefore be located in any of the various spindles $252_A$-$252_N$.

In certain embodiments, storage array 250 may employ a storage space optimization technology called "thin provisioning" when allocating LUNs. When a LUN is "thinly" provisioned, the logical size of the LUN as reported by storage array 250 may be larger than the amount of physical space initially backing that LUN. All consumers of the LUN only see the logical size of the LUN. As write operations are issued to previously unallocated blocks of a thin-provisioned LUN, the amount of actual physical space consumed grows, and at some point, the LUN runs out of physical space. In a similar fashion, in a virtualization environment such as that depicted in FIG. 2A, a virtual disk $222_A$ stored on a LUN of storage array 250 may be configured to be "thinly provisioned," for example, by hypervisor 208 (or by manager 148 in certain embodiments). From the perspective of guest operating system 216, such a thinly-provisioned virtual disk $222_A$ would be perceived as having a fixed logical size, but, in reality, the VMFS allocates LUN storage space to virtual disk $222_A$ (e.g., a .vmdk file) dynamically, such that at any given time, the actual storage space in the LUN that backs virtual disk $222_A$ may be less than the logical size.

The storage array manager 251 implements block allocation unit (BAU) $242_5$. As discussed above, the block allocation unit $242_5$ manages free data blocks and allocates data blocks in a data block layer corresponding to storage array manager 251. Using the techniques described below, block allocation unit $242_5$ allocates data blocks in a manner that increases the likelihood that the data is stored contiguously in physical storage.

Figure 3:
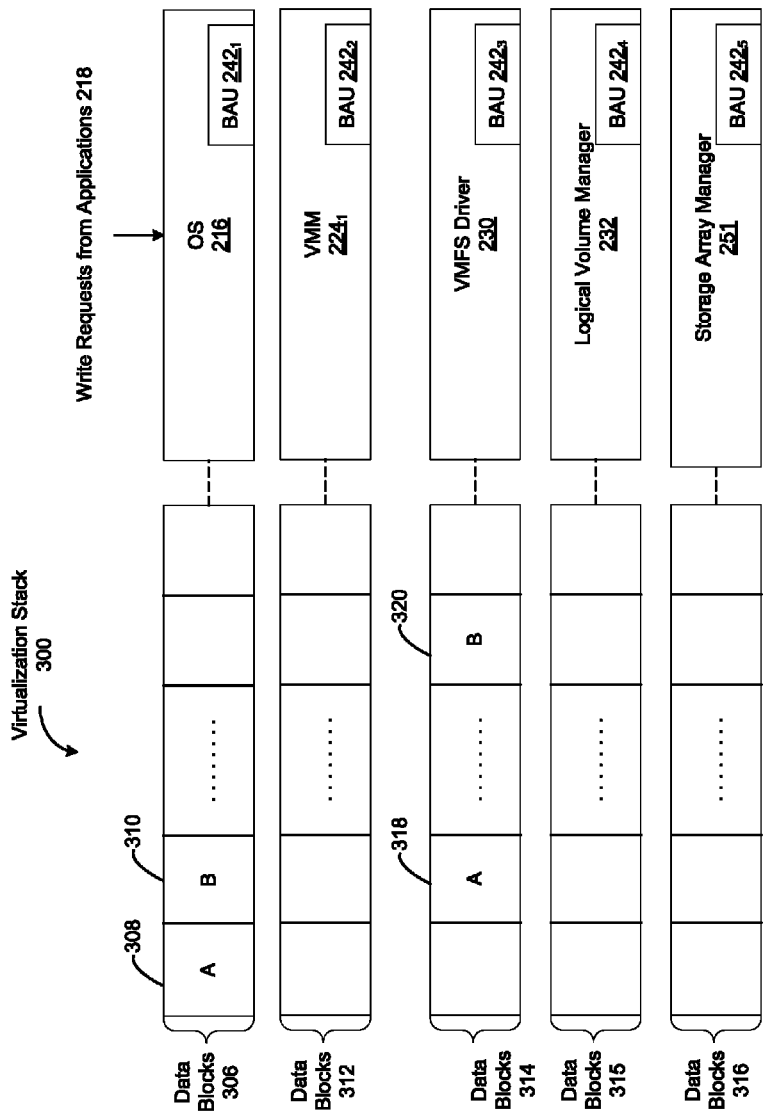
FIG. 3 is a block diagram representative of a storage stack implemented by the server and the storage array of FIGS. 2A and 2B.

FIG. 3 is a block diagram representative of a virtualization stack 300 implemented by the server and the storage array of FIGS. 2A and 2B, according to one or more embodiments. As shown, virtualization stack 300 includes multiple layers of data blocks, such as data block layer 306, 312, 314, 315 and 316 and multiple logical layers, such as OS 216, VMMs 224, VMFS driver 230, logical volume manager 232 and storage array manager 251. Each layer of data blocks includes multiple logical data blocks, such as data blocks 308 and 310 included in data block layer 306, and corresponds to a different logical layer of virtualization stack 300 within server 200 or storage array 250. For example, data block layer 306 corresponds to OS 216, data block layer 312 corresponds to VMM $224_1$ and data block layer 316 corresponds to storage array manager 251.

Each data block represents a logical unit of data storage and can be allocated and/or provisioned. An allocated and/or provisioned data block in a given data block layer is represented in every subsequent layer of virtualization stack 300. For example, data block 308 in data block layer 306 may be represented by data block 318 in data block layer 314. In one embodiment, the sizes of data blocks across different layers of virtualization stack 300 may differ. Because of virtualization logic that may not necessarily allocate data blocks contiguously, contiguous data blocks in a given data block layer, such as data blocks 308 and 310 in data block layer 306, may not be contiguous in subsequent data block layers of virtualization stack 300. For example, data blocks 308 and 310, which are contiguous in data block layer 306, may map to data blocks 318 and 320 in data block layer 314, which are not contiguous. Embodiments described herein aim to increase the likelihood of data blocks that are contiguously stored in one data block layer are contiguously stored in subsequent data block layers.

Each logical layer that corresponds to a data block layer includes a block allocation unit (BAU), shown in FIG. 3 as $242_1$, $242_2$, $242_3$, $242_4$ and $242_5$. As discussed above, when a logical layer transmits a write request, the BAU 242 included in the subsequent logical layer identifies one or more data blocks that are to be allocated for data associated with the write request. For example, when OS 216 transmits a write request to VMM $224_1$ for writing to previously unwritten data regions, BAU $242_2$ in VMM $224_1$ identifies one or more blocks in the data block layer 312 that are to be allocated for data associated with the write request. As discussed below in conjunction with FIGS. 4-7, the block allocation technique implemented by BAUs 242 aims, for a particular write request, to allocate data blocks that would result in data being stored contiguously in the final physical storage layer.

Figure 4:
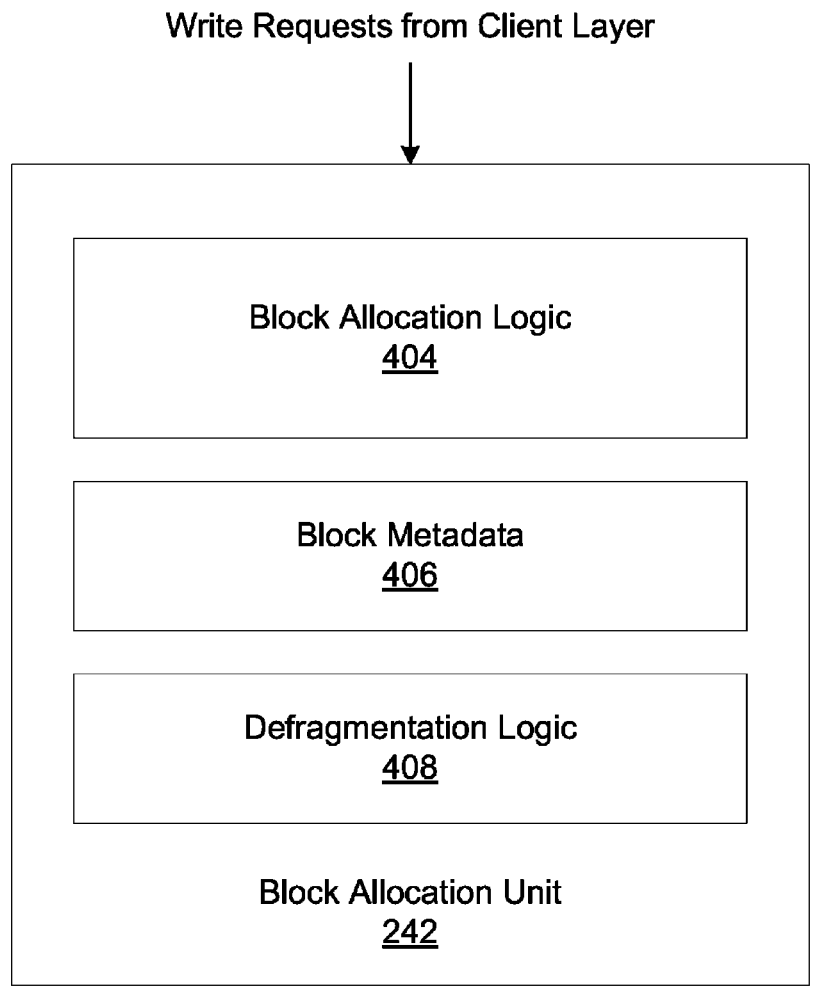
FIG. 4 illustrates a detailed block diagram of a block allocation unit implemented at various layers of the storage stack illustrated in FIG. 3.

FIG. 4 illustrates a detailed block diagram of a block allocation unit 242 that is implemented at various layers of virtualization stack 300. Block allocation unit 242 includes block allocation logic 404 and defragmentation logic 408 and implements mechanisms to persistently store block metadata 406.

In operation, block allocation unit 242 receives a write request from a logical layer of the virtualization stack 300 that indicates the size of the data associated with the write request (referred to herein as "the write data"). The write data is temporarily stored in a write buffer (not shown) until the write data is transmitted to a spindle of storage array 250 for storage. Based on the size of the write data, as indicated by the write request, block allocation logic 404 determines the number of data blocks that are to be allocated for the write data. In the embodiment described herein, block allocation logic 404 accesses block metadata 406 to identify a set of data blocks in the data block layer managed by the block allocation logic 404 for allocation to the write data.

FIG. 5 illustrates a detailed block diagram of block metadata 406 of FIG. 4. As shown, block metadata 406 includes a set of rows, such as row 510 and row 512, and each row in block metadata 406 corresponds to a different data block in the data block layer being managed by block allocation unit 242.

A row corresponding to a particular data block includes a block number 502, allocated state 504, provisioned state 506 and a write tag 508. For a particular data block, block number 502 is a unique identifier associated with that data block. Allocated state 504 for a particular data block indicates whether the data block is allocated or whether the data block is not allocated (free) from the perspective of the BAU 242. In one embodiment, allocated state 504 is represented as a binary field, where a "1" indicates that the data block is allocated and a "0" indicates that the data block is free.

Provisioned state 506 for a particular data block indicates whether the data block is provisioned or unprovisioned. A data block transitions into a provisioned state upon completion of a successful write involving that data block. In one embodiment, as an optimization, the transition to the provisioned state is gated by evaluating the write buffer and checking for known patterns that do not require allocation of data blocks, such as zero writes. A data block may transition to an unprovisioned state if the data block is successfully unmapped and released to the available storage pool. Techniques for unmapping is described in U.S. patent application Ser. No. 13/181,153, filed Jul. 12, 2011 and entitled "System Software Interfaces for Space-Optimized Block Devices," the entire contents of which are incorporated by reference herein. In one embodiment, provisioned state 506 is represented as a binary field, where a "1" indicates that the data block is provisioned and a "0" indicates that the data block is unprovisioned.

Write tag 508 for a particular data block is set the first time that data block is written in response to a write request. All data blocks being written for the first time in response to the same write request share the same write tag value. For example, if three data blocks need to be allocated to service a write request received from a client layer, and data block 0, data block 1 and data block 2 respectively associated with row 510, row 512 and row 514 of block metadata 406, which have never previously been written, are allocated by block allocation logic 404 to service the received write request, upon performing the write, block allocation logic 404 updates write tag 508 for each of data block 0, data block 1 and data block 2 to have the same number (as shown in FIG. 5 as "3"). Blocks that are written together for the first time have very high probability of being contiguous on physical storage. Marking such blocks with the same write tag allows for block contiguity information to be persisted and used for subsequent reallocation operations. In one embodiment, the values to be stored in write tags 508 are monotonically increasing such that, if the value to be stored in write tag 508 for each data block that is written for the first time in response to a write request is X, then the value to be stored in write tag 508 for each data block that is written for the first time in response to an immediately subsequent write request is X+1.

Referring back to FIG. 4, when block allocation unit 242 receives a write request, block allocation logic 404 identifies a set of data blocks in the corresponding data block layer that are to be allocated to service the write request based on block metadata 406. In operation, block allocation logic 404 first determines the number of data blocks that are to be allocated for the write request, and then analyzes block metadata 406 to identify a set of blocks that are indicated as free by allocated state 504. From the set of blocks that are free, block allocation logic 404 determines possible combinations of data blocks (referred to herein as the "possible block allocations") that can satisfy the write request. For example, if two blocks need to be allocated, then, from the set of blocks that are free, block allocation logic 404 identifies each pair of contiguous data blocks that can be allocated to the write request.

For each possible block allocation, block allocation logic 404 computes a weighted allocation score based on provisioned state 506 and write tag 508 associated with each data block included in the possible block allocation. A weighted allocation score for a particular possible block allocation provides a relative indication of the likelihood of the data associated with the write request being stored contiguously in the data block layer being managed by block allocation unit 242. When computing the weighted allocation score, preference is given to possible block allocations including data blocks that are provisioned and share the same write tag value. To compute the weight allocation score for a particular possible block allocation, block allocation logic 404 first sums the provisioned states associated with every data block included in the possible block allocation. The sum of the provision states is then weighted by a pre-determined "provisioned weight." The provisioned weight controls the level of preference given to possible block allocations that include one or more provisioned data blocks. In operation, a high provisioned weight favors previously provisioned data blocks. Next, block allocation logic 404 computes a standard deviation across the write tag values associated with every data block included in the possible block allocation. The standard deviation is then weighted by a pre-determined "tag weight." The tag weight controls the level of preference given to possible block allocations that include two or more blocks having the same write tag. In operation, a low tag weight penalizes data blocks that do not have the same write tag, i.e., data blocks that were not first written together. Block allocation logic 404 then computes the difference between the weighted sum of the provision states and the weighted standard deviation, which results in the weight allocation score for the possible block allocation. A possible block allocation with an ideal weighted allocation score is one that includes data blocks that are all provisioned and that have the same write tag.

Once the weighted allocation score is computed for each possible block allocation, block allocation logic 404 selects one of the possible block allocations. In one embodiment, block allocation logic 404 selects the possible block allocation with the highest weighted allocation score. The data blocks included in the selected possible block allocation are then allocated for the write request.

In one embodiment, in order to quickly converge to the possible block allocation with highest score, a multi-column sort operation is performed on provisioned state 506 and write tag 508 in block metadata 406. From the sorted block metadata 406, possible block allocations are identified one at a time. A weighted score is computed for a possible block allocation when the block allocation is identified, and, if the weighted score matches the ideal weighted score, then the possible block allocation is selected and no more block allocations are analyzed.

To illustrate the operation of block allocation logic 404, suppose block allocation unit 242 receives a write request for which two data blocks need to be allocated. Block allocation logic 404, based on block metadata 406 shown in FIG. 5, first identifies all free data blocks. Based on the identification, block allocation logic 404 determines that data blocks 1, 2, 89, 90, 91 and 92 are free. The block allocation logic 404 then identifies the set of all possible block allocations based on the free blocks. The possible block allocations, when block metadata 406 illustrated in FIG. 5 is used, are: [block 1, block 2], [block 89, block 90], [block 90, block 91], [block 91, block 92]. Next, for the possible block allocations, block allocation logic 404 computes a weighted allocation score and selects the possible block allocation that has the highest score. In one embodiment, the weighted allocation score is computed for the possible block allocations one at a time. If the weighted allocation score of a particular possible block allocation is equal to the ideal weighted score, then the particular possible block allocation is selected and no further weighted allocation scores are computed.

The block allocation techniques described above are implemented by each BAU 242 included in the virtualization stack 300. To service write requests, data blocks are allocated based on write tags at each logical layer of the virtualization stack 300, which ultimately results in data being written to contiguous storage spaces in the physical storage layer. Thus, the block allocation techniques implemented by each BAU 242 aim to reduce fragmentation across different blocks of data that should be stored in the physical storage layer contiguously. However, in some cases, fragmentation may still occur when the BAU 242 is unable to service write requests with contiguous data blocks. Defragmentation logic 408 within BAU 242 addresses this residual fragmentation.

In operation, defragmentation logic 408 within BAU 242 included in the top-most layer of virtualization stack 300 initiates defragmentation by identifying data blocks that are not stored contiguously in the corresponding data block layer. Without initiating any data movement operations, defragmentation logic 408 transmits a defragmentation request to a subsequent layer of virtualization stack 300 specifying the identified data blocks. If the subsequent layer is not the lowest layer, i.e., the physical layer, of virtualization stack 300, then the subsequent layer transmits the defragmentation request to the next layer of virtualization stack 300. If, however, the subsequent layer is the lowest layer of virtualization stack 300, then the subsequent layer analyses the corresponding data block layer to determine whether data blocks in the corresponding data block layer and associated with the data blocks specified in the defragmentation request are contiguous. The data blocks specified in the defragmentation request are contiguous when the write tags 508 of the data blocks included in the block metadata 406 is the same. If, at the lowest layer, data blocks associated with the data blocks identified by the top-most layer are determined to be discontiguous, then a data movement operation is initiated to address the discontinuity. The data movement operation causes data associated with the blocks to be defragmented and to be stored contiguously on the physical medium. Thus, to reap performance gains of physical contiguity, only the physical layer does the actual data movement so that data is stored contiguously on the physical medium.

Figure 6:
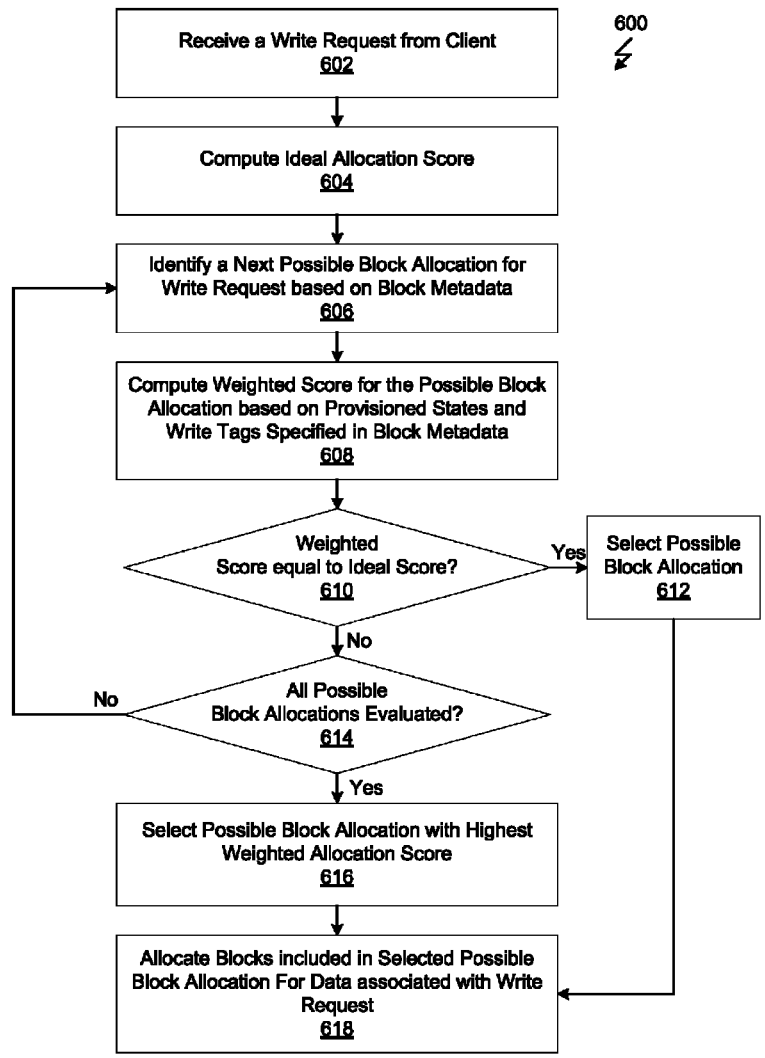
FIG. 6 is a flow diagram that illustrates a method of allocating one or more blocks to a write request received from a client, according to one or more embodiments.

FIG. 6 is a flow diagram that illustrates a method of allocating one or more blocks to a write request received from a client, according to one or more embodiments. This method is carried out by any one of the block allocation units 242. At step 602, block allocation unit 242 receives a write request. At step 604, block allocation logic 404 computes the ideal allocation score for a block allocation that would service the write request. The ideal allocation score is reflective of a block allocation that includes data blocks that are provisioned and have the same write tag. At step 606, block allocation logic 404 identifies a next possible block allocation for servicing the write request based on which data blocks are free as indicated by block metadata 406 and the number of data blocks needed for the write request. At step 608, block allocation logic 404 computes a weighted allocation score based on the provisioned states and the write tag values of the data blocks included in the possible block allocation. The technique implemented by block allocation logic 404 to compute a weighted allocation score according to one embodiment is described in detail in conjunction with FIG. 7.

At step 610, block allocation logic 404 determines whether the weighted allocation score computed for the possible block allocation is equal to the ideal allocation score. If the weighted allocation score is equal to the ideal allocation score, then the method 600 proceeds to step 612, where block allocation logic 404 selects the possible block allocation for servicing the write request. The method 600 then proceeds to step 618, where block allocation logic 404 allocates the data blocks included in the selected possible block allocation for the data associated with the write request.

However, if, at step 610, the weighted allocation score is not equal to the ideal allocation score, then the method 600 proceeds to step 614, where block allocation logic 404 determines whether all possible block allocations have been evaluated. If not, then the method 600 returns to step 606 where a next possible block allocation is selected for evaluated. If, however, all possible block allocations have been evaluated, then the method 600 proceeds to step 616. At step 616, based on the weighted allocation scores, block allocation logic 404 selects the possible block allocation with the highest score. The method 600 then proceeds to step 618, where block allocation logic 404 allocates the data blocks included in the selected possible block allocation for the data associated with the write request.

Figure 7:
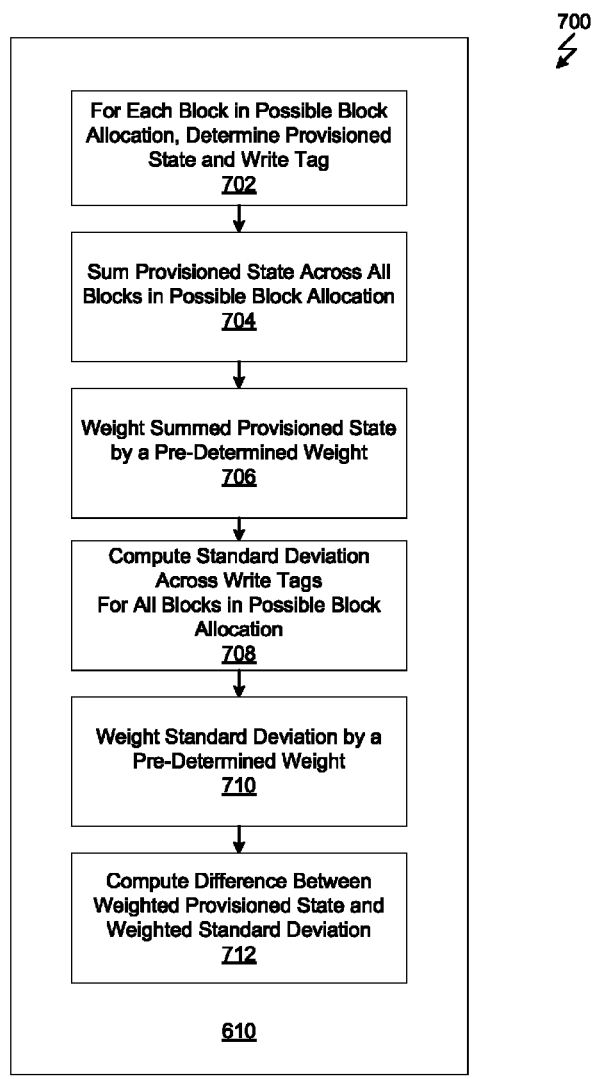
FIG. 7 is a flow diagram that illustrates a method of computing a weighted score for a particular block allocation that may be written in response to a write request, according to one or more embodiments.

FIG. 7 is a flow diagram that illustrates a method of computing a weighted score for a possible block allocation that may service a write request, according to one or more embodiments. At step 702, block allocation logic 404 retrieves from block metadata 406 the provisioned state and the write tag value associated with each data block in the possible block allocation. At step 704, block allocation logic 404 sums the provisioned states of the data blocks included in the possible block allocation. At step 706, block allocation logic 404 weights the sum of the provision states by a pre-determined "provisioned weight." Next, at step 708, block allocation logic 404 computes a standard deviation across the write tag values of the data blocks included in the possible block allocation. At step 710, the standard deviation is weighted by a pre-determined "tag weight." At step 712, block allocation logic 404 computes the difference between the weighted sum of the provision states and the weighted standard deviation, which results in the weight allocation score for the possible block allocation.

It should be recognized that in some cases, the block allocation techniques described above may not result in the optimal result and thus results in fragmentation, such that data blocks that should be stored contiguously are stored discontiguously. In such situations, a periodic defragmentation operation is performed. According to one or more embodiments, the defragmentation operation is initiated by the top-most layer of virtualization stack 300.

Figure 8:
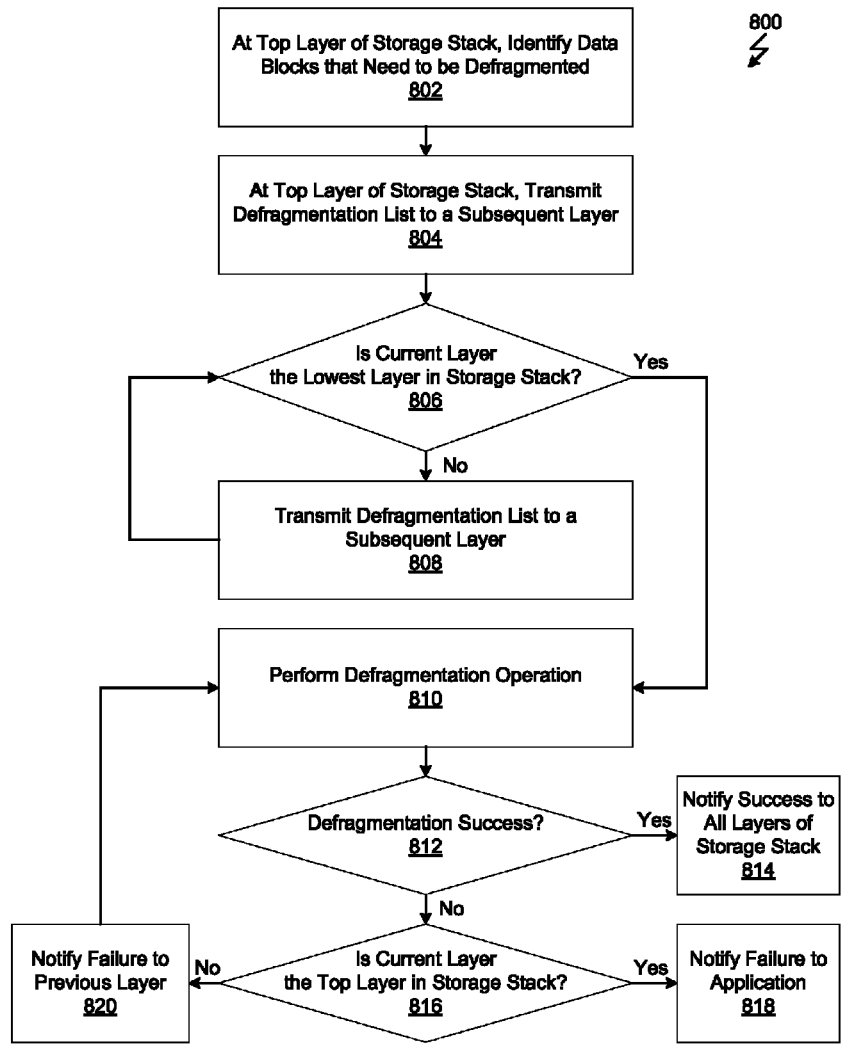
FIG. 8 is a flow diagram that illustrates a method of defragmenting data blocks, according to one or more embodiments.

FIG. 8 is a flow diagram that illustrates a method of defragmenting data blocks, according to one embodiment. At step 802, defragmentation logic 408 within BAU 242 included in the top-most layer of virtualization stack 300 identifies data blocks that need to be defragmented based on the relative positions of the data blocks in the corresponding data block layer. Such data blocks may not be stored contiguously in physical storage. At step 804, defragmentation logic 408 within the top-most layer transmits a defragmentation request to the subsequent layer of virtualization stack 300 that includes a list of the identified data blocks (referred to herein as the "defragmentation list"). At step 806, if the current layer is not the lowest layer, i.e., the physical layer of virtualization stack 300, then the method 800 proceeds to step 808. At step 808, the current layer transmits the defragmentation list to a subsequent layer of virtualization stack 300, and the method 800 then returns to step 806. However, if, at step 806, the current layer is the lowest layer, then the method 800 proceeds to the step 810.

At step 810, defragmentation logic 408 within BAU 242 of the current layer performs defragmentation operations if necessary. In one embodiment, defragmentation logic 408 determines whether data blocks stored in the corresponding data block layer and associated with the data blocks included in the defragmentation list are stored contiguously. If the associated data blocks are stored contiguously, then data movement operations are not necessary. If, however, the associated data blocks are not stored contiguously, then defragmentation logic 408 initiates one or more data movement operations such that the data associated with the data blocks included in the defragmentation list are stored contiguously in the physical storage layer. The data movement operations initiated by defragmentation logic 408 utilize the block metadata 406 and the data block allocation techniques discussed above in conjunction with FIGS. 4-7.

At step 812, if the defragmentation operation was successful, then the method 800 proceeds to step 814, where all the layers of virtualization stack 300 are notified of the successful defragmentation operation. However, if, at step 812, the defragmentation operation was not successful, then the method 800 proceeds to step 816. At step 816, if the current layer is the top layer of virtualization stack 300, then the method 800 proceeds to step 818, where the application 218 is notified of the failed defragmentation operation. However, if, at step 816, the current layer is not the top layer of virtualization stack 300, then the method 800 proceeds to step 820, where the current layer notifies a previous layer of virtualization stack 300 of the failed defragmentation operation. The previous layer then performs step 810 as discussed above.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for defragmenting physical storage that is accessed through a set of layers of a virtualization stack, the method comprising:
receiving a first defragmentation request at a lower layer from an upper layer, the first defragmentation request indicating a plurality of storage blocks for defragmentation;
determining, at the lower layer, a set of storage blocks that correspond to the plurality of storage blocks; and
transmitting by the lower layer a second defragmentation request to a layer that is below thereto, the second defragmentation request indicating the set of storage blocks for defragmentation.

2. The method of claim 1, wherein the layer below the lower layer is at a bottom of the virtualization stack.

3. The method of claim 2, further comprising determining at the bottom layer that defragmentation is necessary and initiating a first set of data movement operations for defragmentation.

4. The method of claim 3, further comprising determining that the data movement operations were not successful, and transmitting by the bottom layer a first failure notification to the lower layer, wherein the lower layer, in response to the first failure notification, initiates a second set of data movement operations for defragmentation.

5. The method of claim 4, wherein the first set of data movement operations is performed by the bottom layer and the second set of data movement operations is performed by the lower layer.

6. The method of claim 4, further comprising:
transmitting by the lower layer a second failure notification to the upper layer; and
responsive to the second failure notification, transmitting by the upper layer a third failure notification to a layer of the virtualization stack that is situated above the upper layer.

7. The method of claim 3, further comprising determining that the data movement operations were successful, and transmitting by the bottom layer a success notification to the lower layer.

8. The method of claim 3, wherein defragmentation is determined to be necessary at the bottom layer by:
analyzing metadata associated with the set of storage blocks; and
determining, based on the metadata, that the set of storage blocks are not stored contiguously in the physical storage.

9. The method of claim 8, wherein the metadata comprises a plurality of write tags, each write tag corresponding to one of the set of storage blocks and storing a value, and determining that the set of storage blocks are not stored contiguously in the physical storage comprises determining that the write tags do not all have a same value.

10. A non-transitory computer readable storage medium comprising instructions executable in a computer system to cause the computer system to carry out a method for defragmenting physical storage that is accessed through a set of layers of a storage stack, the method comprising:
receiving a first defragmentation request at a lower layer from an upper layer, the first defragmentation request indicating a plurality of storage blocks for defragmentation;
determining, at the lower layer, a set of storage blocks that correspond to the plurality of storage blocks; and
transmitting by the lower layer a second defragmentation request to a layer that is below thereto, the second defragmentation request indicating the set of storage blocks for defragmentation.

11. The non-transitory computer readable storage medium of claim 10, wherein the layer below the lower layer is at a bottom of the storage stack, and the method further comprises determining at the bottom layer that defragmentation is necessary and initiating a first set of data movement operations for defragmentation.

12. The non-transitory computer readable storage medium of claim 11, wherein the method further comprises:
determining that the data movement operations were not successful; and
transmitting by the bottom layer a failure notification to the lower layer,
wherein the lower layer, in response to the failure notification, initiates a second set of data movement operations for defragmentation.

13. The non-transitory computer readable storage medium of claim 12, wherein the first set of data movement operations are performed by the bottom layer and the second set of data movement operations are performed by the lower layer.

14. The non-transitory computer readable storage medium of claim 11, wherein defragmentation is determined to be necessary at the bottom layer by:
analyzing metadata associated with the set of storage blocks; and
determining, based on the metadata, that the set of storage blocks are not stored contiguously in the physical storage.

15. The non-transitory computer readable storage medium of claim 14, wherein the metadata comprises a plurality of write tags, each write tag corresponding to one of the set of storage blocks and storing a value, and determining that the set of storage blocks are not stored contiguously in the physical storage comprises determining that the write tags do not all have a same value.

16. A virtualized computing system comprising:
a server;
a physical storage; and
a virtualization stack implemented by the server and the physical storage, the virtualization stack comprising a set of layers through which the physical storage is accessed, and configured to carry out a method for defragmenting the physical storage, the method comprising:
receiving a first defragmentation request at a lower layer from an upper layer, the first defragmentation request indicating a plurality of storage blocks for defragmentation;
determining, at the lower layer, a set of storage blocks that correspond to the plurality of storage blocks; and
transmitting by the lower layer a second defragmentation request to a layer that is below thereto, the second defragmentation request indicating the set of storage blocks for defragmentation.

17. The system of claim 16, wherein the layer below the lower layer is at a bottom of the virtualization stack, and the method further comprises determining at the bottom layer that defragmentation is necessary and initiating a first set of data movement operations for defragmentation.

18. The system of claim 17, wherein the method further comprises:
   determining that the data movement operations were not successful; and
   transmitting by the bottom layer a failure notification to the lower layer,
   wherein the lower layer, in response to the failure notification, initiates a second set of data movement operations for defragmentation.

19. The system of claim 17, wherein defragmentation is determined to be necessary by:
   analyzing metadata associated with the set of storage blocks; and
   determining, based on the metadata, that the set of storage blocks are not stored contiguously in the physical storage.

20. The system of claim 19, wherein the metadata comprises a plurality of write tags, each write tag corresponding to one of the set of storage blocks and storing a value, and determining that the set of storage blocks are not stored contiguously in the physical storage comprises determining that the write tags do not all have a same value.

* * * * *